United States Patent [19]

Kanda et al.

[11] Patent Number: 5,092,938

[45] Date of Patent: Mar. 3, 1992

[54] TEMPERATURE DETECTOR FOR USE IN HIGH TEMPERATURE AND HIGH PRESSURE FURNACES

[75] Inventors: Takeshi Kanda, Hyogo; Takao Fujikawa; Shigeo Kofune, both of Kobe, all of Japan

[73] Assignee: Kabushiki Kaisha Kobe Seiko Sho, Kobe, Japan

[21] Appl. No.: 258,113

[22] Filed: Oct. 14, 1988

Related U.S. Application Data

[63] Continuation of Ser. No. 9,595, Jan. 29, 1987, abandoned, which is a continuation of Ser. No. 719,454, Apr. 3, 1985, abandoned.

[30] Foreign Application Priority Data

Apr. 14, 1984 [JP] Japan .................................. 59-75652
Jul. 24, 1984 [JP] Japan ......................... 59-112928[U]

[51] Int. Cl.$^5$ ............................................. H01L 35/02
[52] U.S. Cl. ...................................................... 136/230
[58] Field of Search ........................................ 136/230

[56] References Cited

U.S. PATENT DOCUMENTS

| | | | |
|---|---|---|---|
| 885,430 | 4/1908 | Bristol | 136/234 |
| 2,335,707 | 11/1943 | Streicher | 136/236.1 |
| 2,412,564 | 12/1946 | Current | 136/230 |
| 2,480,557 | 8/1949 | Cummins | 136/230 |
| 2,794,059 | 5/1957 | Smith | 136/230 |
| 2,946,835 | 7/1960 | Wewtbrook et al. | 136/210 |
| 3,061,656 | 10/1962 | Chappell | 136/234 |
| 3,379,578 | 4/1968 | McTaggart et al. | 136/234 |
| 3,467,542 | 9/1969 | Nordlie | 136/234 |
| 3,497,398 | 2/1970 | Ehrenberg et al. | 136/234 |
| 3,764,395 | 10/1973 | Boyle | 136/234 |
| 4,125,738 | 11/1978 | Nichols | 136/234 |
| 4,238,957 | 12/1980 | Bailey et al. | 136/234 |
| 4,268,710 | 5/1981 | Hampl, Jr. | 136/236.1 |
| 4,430,518 | 2/1984 | Nakajima et al. | 136/234 |
| 4,454,370 | 6/1984 | Voznick | 136/230 |

OTHER PUBLICATIONS

"Handbuch Der Technischen Temperaturmessung", Fritz Lieneweg, pp. 75-79; Mit 329 Bildern, 1976.

*Primary Examiner*—Robert J. Hill, Jr.
*Attorney, Agent, or Firm*—Oblon, Spivak, McClelland, Maier & Neustadt

[57] ABSTRACT

A temperature detector for use in a high temperature and high pressure furnace, including thermocouple wires received in a tubular protective sheath for protection against the furnace atmosphere, and characterized by the provision of a pair of rod members of a large diameter serving as a thermocouple pair for the positive and negative sides thereof, a protective sheath having a rod suspending holder portion in an upper portion thereof for supporting the thermocouple rod members therein in a vertically suspended state and arranged to hold the rod members out of contact with each other except at a temperature measuring point and to contact the rod members with the protective sheath only in a region other than a high temperature region of the furnace.

20 Claims, 6 Drawing Sheets

TEMPERATURE DETECTOR FOR USE IN HIGH TEMPERATURE AND HIGH PRESSURE FURNACES

This application is a continuation of application Ser. No. 07/009,595, filed on Jan. 29, 1987, now abandoned, which is a continuation of application Ser. No. 06/719,454, filed Apr. 3, 1985, now abandoned.

BACKGROUND OF THE INVENTION

1. Field of the Invention

This invention relates to a temperature detector for measuring high temperatures, especially suitable for use in a pressurized gas atmosphere of a high temperature about 2000° C., for example, in pressurized sintering furnaces and hot isostatic presses (hereinafter referred to simply as "HIP" for brevity), and more particularly to a thermocouple temperature detector with an improved construction for supporting thermocouple wires.

2. Description of the Prior Art

Recently, large investments are made in the research and development of non-oxide ceramics such as silicon nitride ($Si_3N_4$) and silicon carbide (SiC) which are looked upon as a high-strength material suitable for application to high-efficiency gas turbines and Diesel engines. In the manufacturing processes of $Si_3N_4$, for example, it has been considered to use a pressurized sintering furnace which holds an $N_2$ atmosphere of 1800°–2100° C. under pressure of 10–100 kgf/cm², or a HIP apparatus which holds an $N_2$ atmosphere of 1700°–1800° C. under pressure of 1000–2000 kgf/cm².

Figure 7:
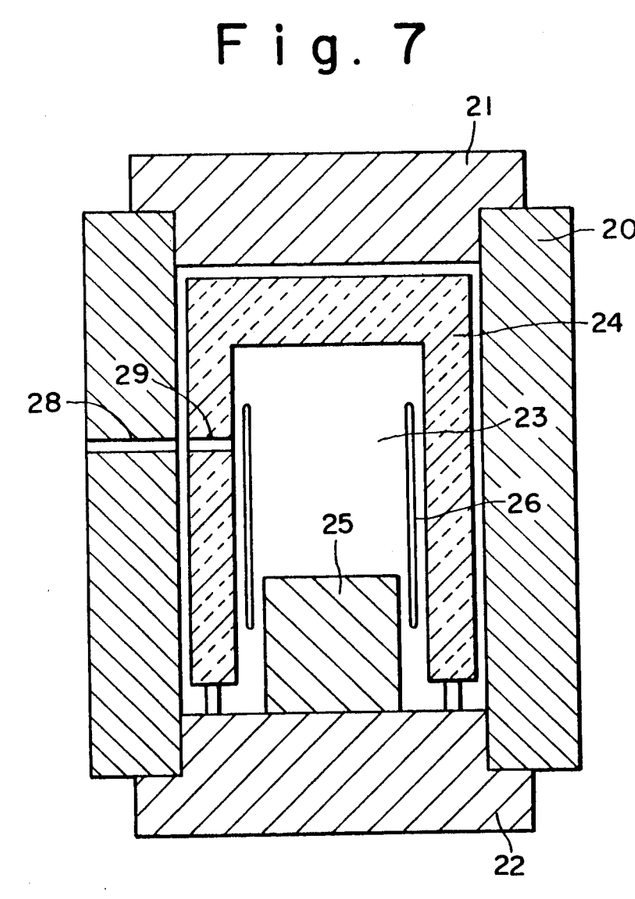
FIG. 7 is a view similar to FIG. 6 but showing a conventional temperature measuring method.

With regard to the means for measuring temperatures in such pressurized sintering furnaces and HIP apparatus, it is desirable to employ an optical temperature detector in view of the operation in a high temperature range which in some cases exceeds 1700° C. However, in the case of an optical temperature detector, it is necessary to lead the radiant light from a furnace directly to a sensor portion of the detector. For instance, in a HIP apparatus as shown in FIG. 7, openings 28 and 29 have to be formed through a pressure container 20 with upper and lower lids 21 and 22 and through a heat shielding wall 24 which is located between the inner wall surface of the pressure container and a processing chamber 23 including a support member 25 and a heater 26.

The provision of such opening 28, however, impairs the strength of the pressure container 20, while the opening 29 induces circulation therethrough of the pressurizing gas medium, exposing the inner wall surfaces of the container to a high temperature and as a result inviting large heat losses. The application of the optical temperature detector is therefore substantially difficult, and presently can be found in pressurized sintering furnaces of up to about 10 kgf/cm²G.

As a temperature detector for pressurized sintering furnaces and HIP apparatus operating at a pressure level higher than 10 kgf/cm²G, there are no suitable temperature detectors on the market except W-Re base thermocouples (e.g., W-Re 5/26 thermocouple, a product of HOSKINS of the United States, 0.5 mm in wire diameter). Accordingly, in the case of a HIP apparatus, attempts have been made to embed, in the heat shielding wall of the pressure container, a commercially available thermocouple which is inserted in an insulating tube and retained at the upper end of thereof, the thermocouple and insulating tube being received in a protective sheath which is closed at the fore end thereof.

However, the conventional method in which the insulating tube and thermocouple are contacted with each other in broad high temperature areas has a problem that is practically difficult to avoid shunt errors due to drops of electric insulation of the tube.

Further, the above-mentioned commercially available thermocouples normally have a small wire diameter of about 0.5 mm, so that, if applied to a HIP apparatus having a diameter of 200 mm and a length of 500 mm and a temperature range up to 2000° C., breakage of the fine thermocouple wire is very likely to occur due to coarsening of crystal grains. Consequently, it is often the case that a thermocouple has a very short service life, enduring only one operation or so. This naturally hinders industrilization of the HIP apparatus of 2000° C. class.

SUMMARY OF THE INVENTION

With the foregoing situations in view, the present invention has as its object the provision of a temperature detector which can improve the accuracy of temperature measurement by a thermocouple and at the same time elongate the service life of W-Re thermocouples, while enhancing the efficiency of the temperature measuring means for furnaces operating under high temperature and high pressure conditions and removing the problems which bar its application to industrial processes.

According to one aspect of the invention, the foregoing objective is achieved by the provision of a temperature detector suitable for use in a high temperature and high pressure furnace, including thermocouple wires received in a tubular protective sheath for protection against the furnace atmosphere, characterized in that the temperature detector comprises: a pair of rod members of a large diameter serving as thermocouple pair for the positive and negative sides thereof; a protective sheath having a rod suspending holder portion in an upper portion thereof for supporting the rod members therein in a vertically suspended state and arranged to hold the rod members out of contact with each other except a temperature measuring point and to contact the protective sheath with the rod members only in a region other than a high temperature region of the furnace.

According to another aspect of the invention, there is also provided a temperature detector for use in a high temperature and pressure furnace, including thermocouple wires received in a tubular protective sheath for protection against the furnace atmosphere, characterized in that the temperature detector comprises: an insulating tube having a rod suspending holder portion in an upper portion thereof for supporting the rod members therein in a vertically suspended state and provided with rod receptacle holes having a greater diameter than the rod members at least in a high temperature region of the furnace to form a clearance between the thermocouple rod members and rod receptacle holes and to suspend the rod members concentrically in the rod receptacle holes substantially in contact-free state.

The above-mentioned thermocouple is mainly made of a W and/or W-Re base material, and the rod members constituting its major components have greater diameter and rigidity as compared with conventional counterparts which are normally about 0.5 mm in diameter, more specifically, the rod members on the positive and negative sides have a diameter larger than 3 mm.

These rod members are provided with screw portions at the opposite ends thereof, which are either threadedly engaged with a rod fastening button or joined by shrink fit or other mechanical means or welded together to constitute a thermocouple pair.

Although the rod fastening button may be made of either a material which constitutes the rod member of the positive or negative side in consideration of the machining operation and strength, it is preferred to be of the material of the negative side which has higher ductility. However, needless to say, it is possible to assemble the thermocouple by the use of a material other than those of the positive and negative rod members, or by the use of a material which is intermediate between the positive and negative rod members in composition.

It is also preferable to use tightening nuts to strengthen the threaded engagement of the rod members with the fastening button. In such a case, the nuts on the positive and negative sides are suitably formed of the materials of the positive and negative rod members, respectively, to prevent loosening due to a difference in thermal expansion coefficient and to produce the thermo-electromotive force stably.

The thermocouple with the above-described construction according to the invention has a large diameter rods which are barely susceptible to breakage caused by coarsening of crystal grains, but they are less flexible as compared with the conventional thermocouple wires. Therefore, if the rod members which are joined at one ends are fixed by insulating members at the other ends or at suitable intermediate portions of the rod members, deformation similar to bimetal may occur due to the difference in thermal expansion coefficient between the two rod members, damaging the rod members by thermal stress in a worse case. For example, a W5%Re alloy has a thermal expansion coefficient of about $5 \times 10^{-5}/°C$. and a W26%Re alloy has a thermal expansion coefficient of about $8 \times 10^{-5}/°C$., so that, in the case of 1 m long rod members, the difference of elongation resulting from their thermal expansion amounts to about 6 mm at 2000° C. In order to preclude this problem arising from the difference in thermal expansion between the two rod members, it is desirable to leave the remote ends of the rod members in free state to absorb the rod elongations by thermal expansion.

For this purpose, in a case where the insulating tube is omitted, the thermocouple is supported in the protective sheath by a rod holder portion provided in an upper portion of the protective sheath, the holder portion suspending the thermocouple vertically in the protective sheath without contacting the rod members at least in a high temperature region and in such a manner as to keep the two rod members out of contact with each other at any portion except a temperature measuring point.

In a case where an insulating tube is used, the thermocouple of the above-described construction is inserted in an insulating tube with a couple of receptacle holes to receive the positive and negative rod members, respectively, in such a manner that the rod members are suspended vertically from the upper end of the insulating tube. Although the insulating tube may be constituted by a single elongated tubular body, it is preferred to employ a plural number of short tubes to permit adjustment of the tube length, stacking the short tubes one after another in a suitable length.

In the latter case, it is necessary to stack the short tube sections in concentric relation with each other, and to this end, the insulating tube is preferably provided with a couple of through holes in addition to the above-mentioned rod receptacle holes, inserting aligning rods in the through holes over the entire axial lengths thereof to align them in concentric relation over the entire length in the axial direction. In consideration of its durability at 2000° C., the centering rod is preferably made of a W and/or W-Re material similar to the rod members of the thermocouple.

Furthermore, in addition to the concentric alignment of the rod receptacle holes, the through holes may be used for checking characteristics of electromotive force of the thermocouple, by inserting thereinto the wire of a commercially available thermocouple with approved characteristics, for example, a thermocouple produced by HOSKINS of the United States.

The material of the protective sheath which accommodates the thermocouple is preferred to be BN from the standpoints of durability at 2000° C., machinability and cost. Further, a Mo- or W-base metallic material with a high melting point is peferred from the standpoints of securing an atmosphere for the thermocouple wires, namely, preventing deteriorations of the thermocouple which would result from reaction of a thermocouple with the impurities which creep into the furnace gas from the wall of the protective sheath, or from reaction of a thermocouple with the impurity contents which evaporate from the protective sheath at high temperatures, or for producing the shielding effects against electric noises. For example, where a metallic material of high melting point is used, it is possible to restrict its use only to a high temperature range at a level of about 2000° C., using a metallic material of low melting point such as inconel and stainless steel in a temperature range below 1000° C.

In a case where the insulating tube is employed, it is preferably formed of BN from the standpoints of the durability at the level of 2000° C., machinability and cost as mentioneded above. However, it is also possible to use $Al_2O_3$ in a region beneath the thermocouple unit, that is to say, in a region where the temperature is below 1800° C.

On the other hand, in order to secure appropriate properties as a thermocouple, it is necessary to hold same in suspended state without permitting the positive and negative rod members to contact with each other except the temperature measuring point as mentioned hereinbefore. Since the rod members have a diameter larger than 3 mm and sufficient rigidity, this requirement can be easily fulfilled simply by controlling their verticality in the suspending holders. Similarly, the contact of the rod members with the protective sheath or the insulating tube except the suspending holders can be easily avoided.

Namely, in a construction which omits the insulating tube, although the positive and negative rod members are easily kept off contact with each other and with the protective sheath by maintaining their verticality in the suspender holders, it is preferred to provide a more stable construction including a spacer for maintaining a distance between the two rod members at a position beneath the suspender holders. More preferably, the spacer is provided in a low temperature region below the upper end portion of a work support block which serves as a heat insulator on the bottom side of the processing chamber on the HIP apparatus, thereby keeping the rigid thermocouple rod members out of contact with other components in high temperature regions of the processing chamber except the rod suspending holders to preclude shunt errors caused by drops in electric insulation of the spacer at high temperatures. The same applies to the construction which incorporates the insulating tube or tubes, in which the same effect can be obtained by forming the rod receptacle holes of at least one insulating tube in the same diameter as the thermocouple rod members.

Thus, in a case where the insulating tube is not used, the temperature detector is constituted by a protective sheath unit having the rod members of the thermocouple vertically disposed therein in suspended state, and an upper unit closed at one end and mounted on top of the sheath unit for protection of the atmosphere, and the whole body of the detector is located vertically within a furnace chamber. With such a construction, for supporting the rod members of the thermocouple in suspended state in the protective sheath, the upper portion of the protective sheath is formed in a suitable shape, or a rod suspending holder portion of a suitable shape, for example, an inwardly protruding annular projection or projections may be provided on the inner side of the protective sheath in abutting engagement with the rod fastening button.

However, in such a case it is difficult for the thermocouple suspending portion to avoid contact with the thermocouple, so that substances constituting the thermocouple and the protective sheath may invite drops in the thermo-electromotive force by interfusion as a result of the contact, coupled with a demerit that replacement of a used thermocouple becomes difficult due to seizure in a long metallic protective sheath.

As a measure for overcoming these problems, it is preferable to insert a suitable material, taking into consideration its reactivity with the thermocouple suspending portion. Above all, this insert portion can be minimized by adoption of a suitable construction, so that it is possible to select a material of suitable properties, ignoring its machinability and cost. For example, it is possible to employ BeO and $ThO_2$ which are excellent in electric insulation but problematic for toxicity or radiation, or to employ costly $HfO_2$, $Y_2O_3$ or the like. Depending upon temperature, there may also be employed $Al_2O_3$ or $ZrO_2$. A material of this sort may be formed into a shape of a ring or button and mounted on the rod holder portion or on the lower side of the rod fastening button, or alternatively it may be coated on the rod holder portion or on the lower side of the rod fastening button by a suitable coating means such as vacuum vapour deposition, spattering, PVD, CVD, spraying process or the like.

Further, when removing a used thermocouple from a protective sheath after a service, there is possibilities of the component parts of the sheath sticking together without becoming loose. Therefore, it is desirable to employ a construction which permits to insert the thermocouple into the protective sheath from beneath and suspend same by hooking on an upper portion of the sheath.

Where the above-described thermocouple unit employs a long metallic protective tube, it is also desirable to ground the sheath for the purpose of avoiding electric noises on the thermocouple.

Needless to say, the insertion or coating of a heterogeneous material is also applicable to a construction using an insulating tube.

The above and other objects, features and advantages of the invention will become apparent from the following description and the appended claims, taken in conjunction with the accompanying drawings which show by way of preferred embodiments of the invention.

DESCRIPTION OF PREFERRED EMBODIMENTS

Hereafter, the invention is described more particularly by way of preferred embodiments shown in the drawings.

Figure 1A:
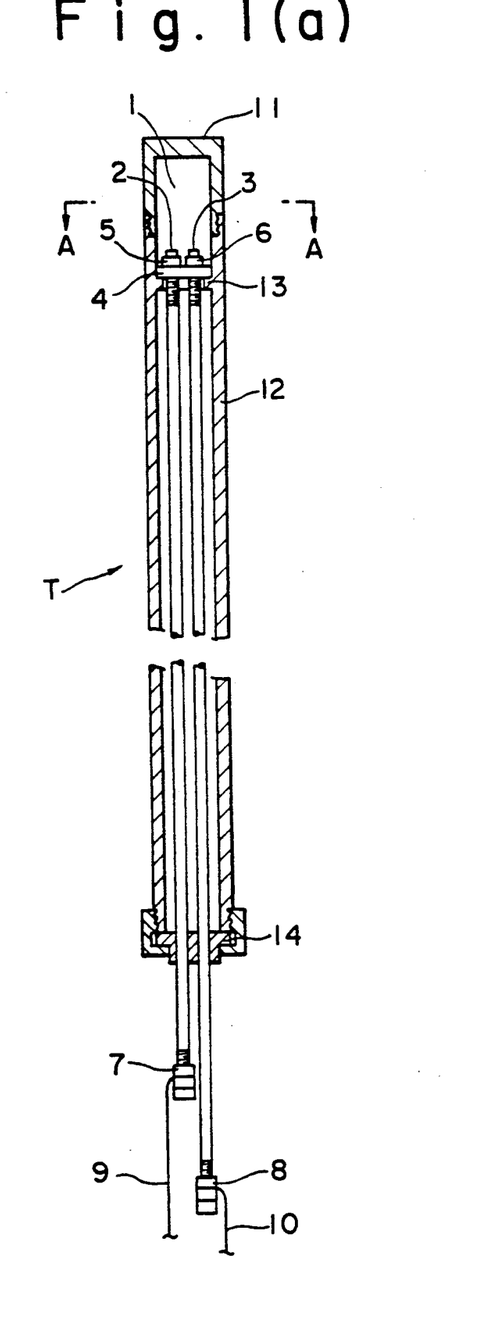
FIG. 1(a) is a schematic longitudinal section of a thermocouple unit according to the invention, part of the thermocouple unit being cut away for the convenience of illustration.
Figure 1B:
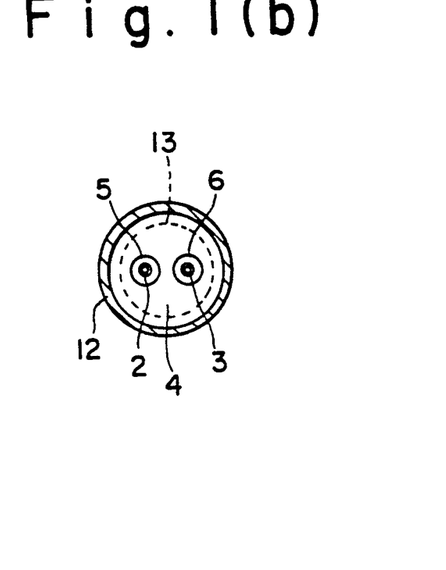
FIG. 1(b) is a transverse section taken on line A—A of FIG. 1(a)

Referring first to FIG. 1, there is shown an example of the thermocouple unit which constitutes a major part of the high temperature detector according to the invention, in which indicated at T is a thermocouple unit, at 1 is a thermocouple of a threaded construction, at 2 is a rod member on the positive side of the thermocouple, and at 3 is similarly a rod member on the negative side of the thermocouple. These rod members 2 and 3 are provided with tapped portions at their upper and lower ends, and have the upper tapped portions threaded into a rod fastening button 4 and fastened to the latter by fastening nuts 5 and 6. The two rod members 2 and 3 in the button 4 are vertically suspended from a holder portion 13 which is provided in an upper portion of a protective sheath 12 which receives the rod members, while a spacer 14 of an insulating material which serves up to maintain a distance stably between the two rod members 2 and 3 is located in a lower portion of a low temperature region where the spacer can ensure sufficient insulation, thereby forming the afore-mentioned thermocouple 1. Nuts 7 and 8 of the same material and shape as the nuts 5 and 6 are tightly threaded on the lower tapped portions at the lower ends of the rod members which are projected downward through the spacer 14, the nuts having lead wires 9 and 10 attached thereto to facilitate connection to a temperature recorder which is not shown.

An upper protective sheath 11 which is closed at its upper end is capped on the main protective sheath 12 which is arranged in the above-described manner, thereby to shielding off the atmosphere.

With regard to the materials for the rod members 2 and 3 in the above-described thermocouple construction, the rod member 2 of the positive side is formed of a W or W-Re base material such as W-3%Re or W-5%Re. On the other hand, the rod member 3 of the negative side is formed of a material corresponding to the material of the positive rod member 2, for example, of W-26%Re for a positive rod member of W or W-5%Re or of W25%Re for a positive rod member of W-3%Re in normal cases. The rod diameter is preferred to be greater than 3 mm for securing sufficient rigidity of the rods and facilitating the operation of screw tapping, especially, the female screw tapping, and in consideration of the expected length of service life when applied to industrial equipments.

The afore-mentioned fastening button 4 into which the rod members are threaded is provided with female screw portions in two spaced positions as shown particularly in FIG. 1(b), and normally made of a material same as the positive or negative rod member or a material intermediate between the positive and negative rod materials in composition. Of the nuts 5 to 8, those on the positive side are made of the same material as the positive rod member 2 and those on the negative side are formed of the same material as the negative rod member 3.

The lead wires 9 and 10 which facilitate the connection of the large-diameter rod members 2 and 3 are made of, for example, 0.5 mm compensating lead wires for W-Re produced by HOSKINS of the United States.

Illustrated in FIGS. 2 to 5 are further embodiments of the invention, which are same as the foregoing embodiment in basic construction and in which like component parts are designated by like reference numerals.

Figure 2:
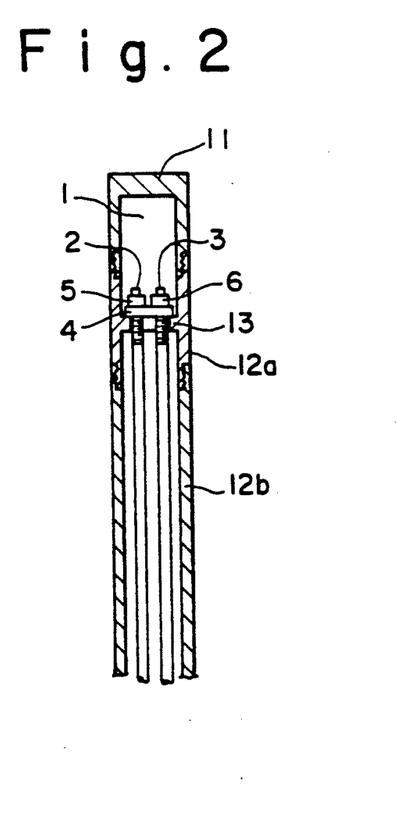
FIGS. 2 to 4 are fragmentary longitudinal sections of further embodiments of the invention.

The embodiment of FIG. 2 employs a protective sheath consisting of an upper portion with a rod suspending holder 13 and a lower section 12b without such a rod holder portion, for the purpose of facilitating the machining operation of the rod suspending holder 13 to be provided in the upper portion of the protective sheath.

Figure 3:
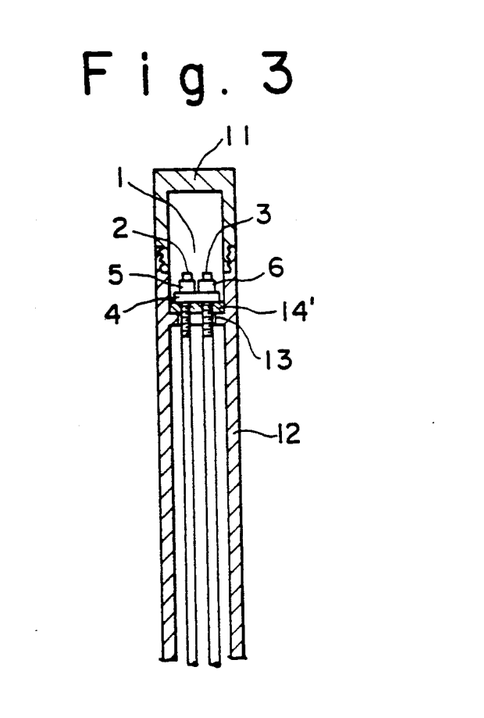

In the embodiment of FIG. 3, an upper spacer ring 14' of a material different from the protective sheath is inserted between the rod suspending holder 13 and the fastening button 4 to prevent deteriorations in thermoelectromotive force due to interfusion of metals which might be caused by contact of the rod members with the rod suspending holder in a case where the latter is made of a metal, or to prevent seizure of a used thermocouple in other metallic components which makes replacement of the thermocouple difficult.

Figure 4:
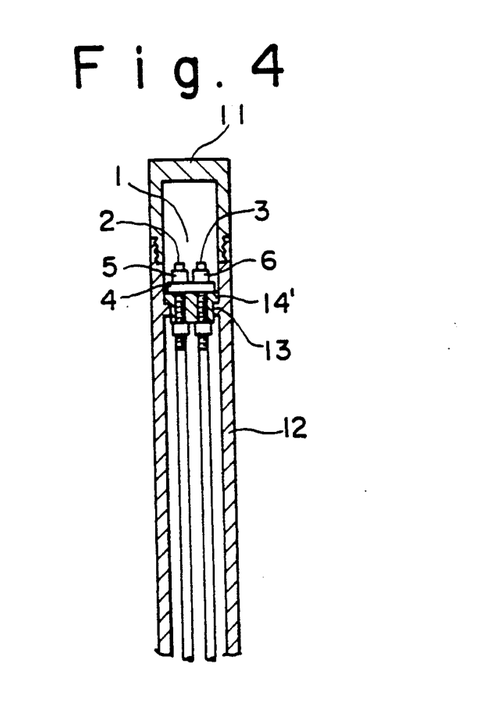

Referring to FIG. 4, there is illustrated an embodiment in which a button-shaped upper spacer 14' is mounted on the side of the thermocouple to produce the effects similar to the spacer 14' of FIG. 3. A spacer of a heterogeneous material may be either inserted as a separate part as shown in FIGS. 3 and 4, or deposited on the upper or lateral side of the rod suspending holder 13 or on the lower or lateral side of the rod fastening button 4 by a coating process even in the case of the thermocouple construction shown in FIG. 1.

Figure 5A:
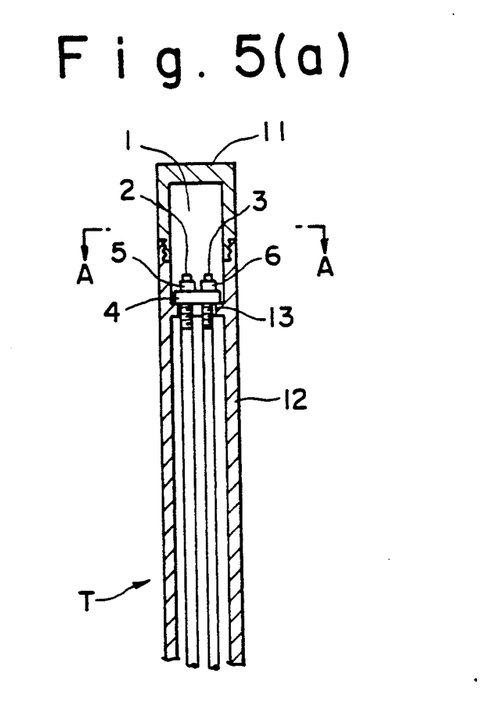
FIG. 5(a) is a fragmentary longitudinal section of another embodiment of the invention.
Figure 5B:
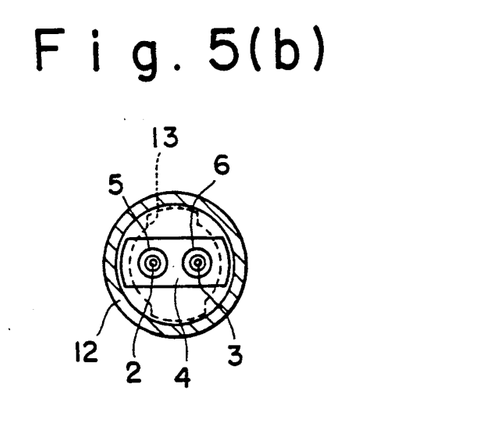
FIG. 5(b) is a schematic transverse section taken on line A—A of FIG. 5(a)

Illustrated in FIG. 5 is a further embodiment in which the rod suspending holder 13 and fastening button 4 are formed in the shapes of FIG. 5(b) in plane view, suspending the thermocouple on the holder 13 by turning the rod fastening button 4 through 90° after inserting the thermocouple into the protective sheath from beneath. This rod holder construction is applicable to the embodiments of FIGS. 3 and 4 to facilitate replacements of used thermocouples even in a case where disassembling of the protective sheath becomes difficult after service at high temperatures, and thus to reduce the running cost.

Figure 6:
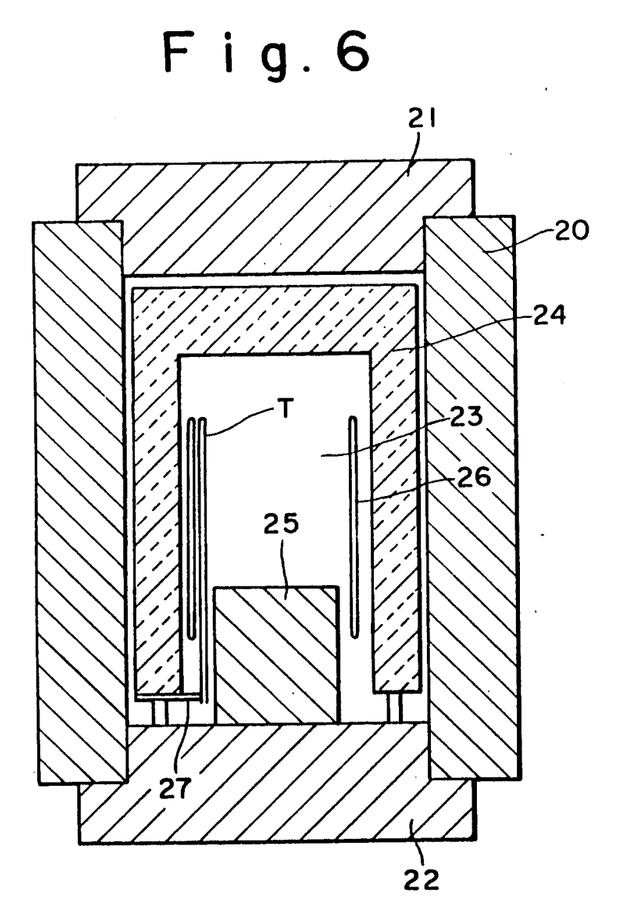
FIG. 6 is a schematic vertical section of a HIP apparatus incorporating the thermocouple temperature detector according to the invention.

FIG. 6 shows an example of application of the thermocouple temperature detector, namely, a HIP apparatus having the thermocouple mounted in a high temperature and pressure furnace of a HIP apparatus by a support member 27 at a position on the inner side of a heat insulating wall 24. In this particular example, the support member 27 is made of a metallic material, and may be electrically short-circuited to the lower lid of the high pressure container to utilize the electric shielding effect of the protective sheath, thereby to provide a stable temperature detector which is free of the influence of electronic noises which are produced upon turning on a power switch.

Figure 8A:
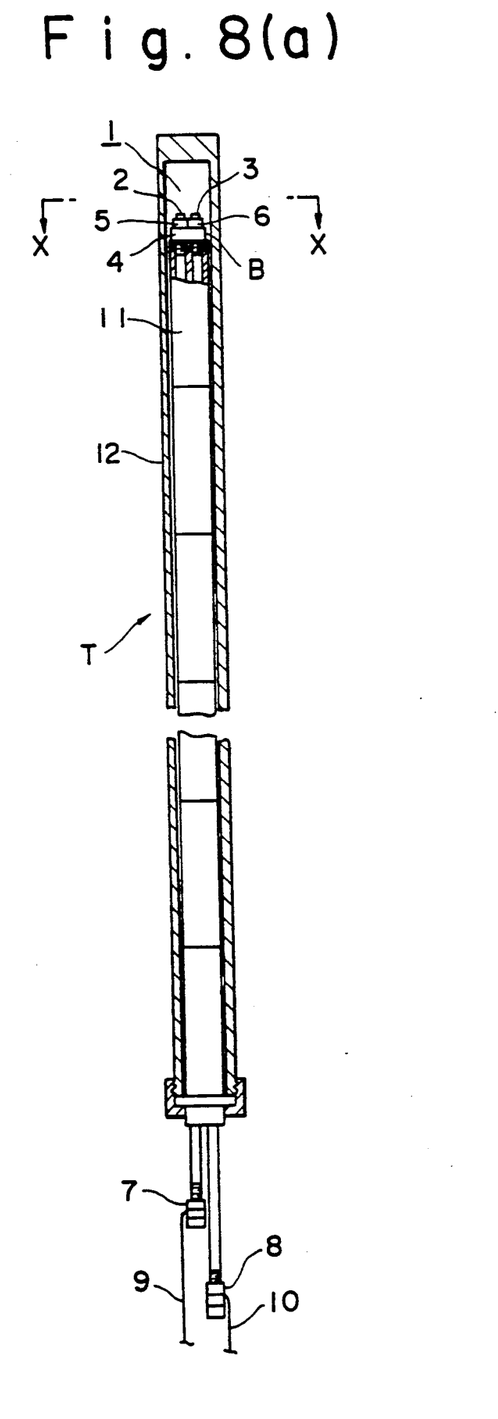
FIG. 8(a) is a schematic longitudinal section of a modified thermocouple unit construction according to the invention.
Figure 8B:
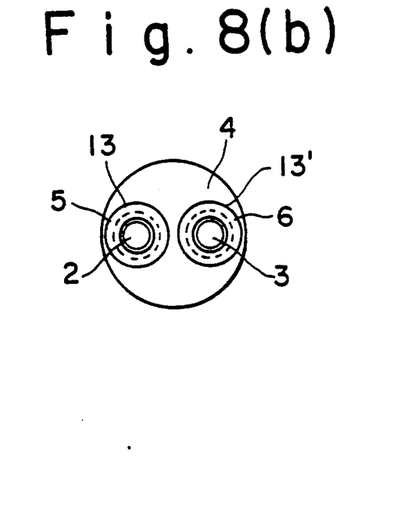
FIG. 8(b) is a schematic transverse section of the thermocouple unit of FIG. 8(a)

Referring now to FIGS. 8(a) and 8(b), there is shown a further embodiment which is same as the first embodiment of FIG. 1 except that the rod members 2 and 3 joined by the coupling button 4 at the upper ends are received and suspended in rod receptacle holes 33 and 33' of an insulating tube 31 which is constituted by a number of concentrically stacked, short tubular sections and accommodated in a protective sheath 12.

Figure 9:
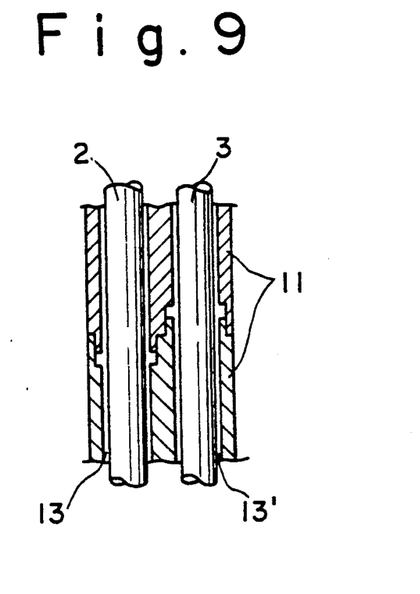
FIG. 9 is a fragmentary longitudinal section, showing thermocouple rod members fitted in rod receptacle holes of an insulating tube.

The rod receptacle holes 33 and 33' of the insulating tube 31 are formed in a diameter appreciably larger than the rod members 2 and 3 of the thermocouple, and it is important in this case that the rod receptacle holes 33 and 33' of the respective tubular sections are stacked in the axial direction in concentric alignment with each other as shown in FIG. 9.

As a material for the insulating tube 31, there may be employed BN for use at a level of 2000° C. and $Al_2O_3$ for use at a level lower than 1800° C.

Figure 10A:
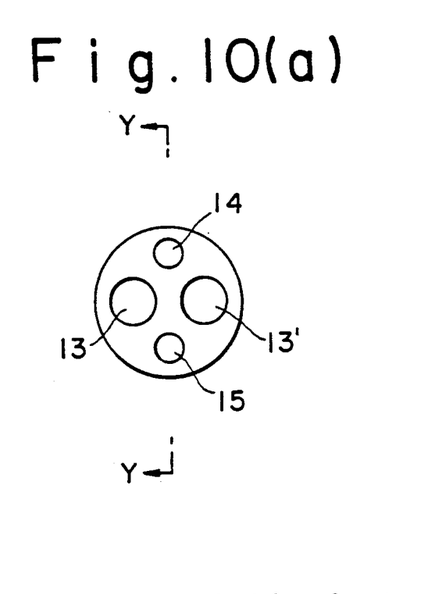
FIG. 10(a) and 10(b) are a top view and a fragmentary section of the insulating tube taken on line Y—Y of FIG. 10(a)
Figure 10B:
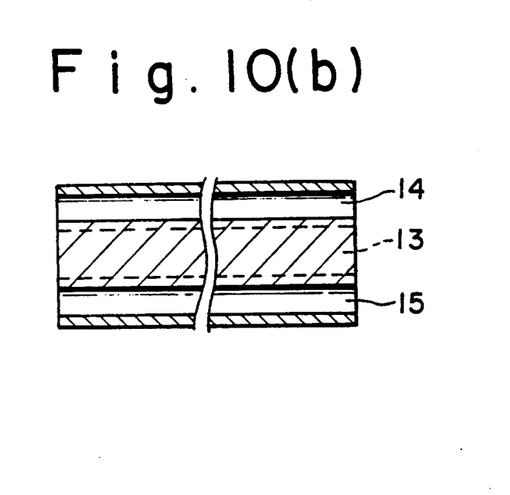
Figure 11A:
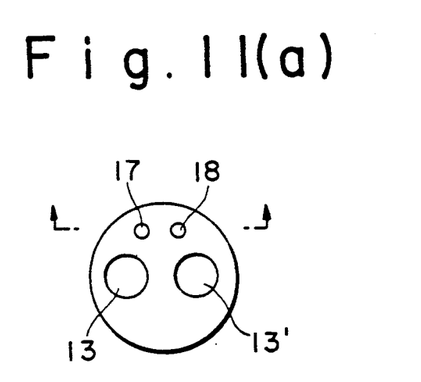
FIGS. 11(a) and 11(b) and FIGS. 12(a) and 12(b) are top views and fragmentary sections, showing examples of means for concentrically aligning rod receptacle holes of the insulating tube.
Figure 11B:
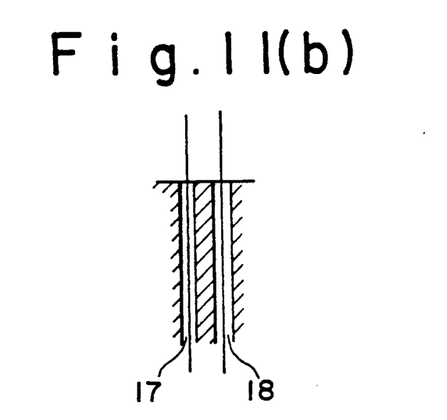
Figure 12A:
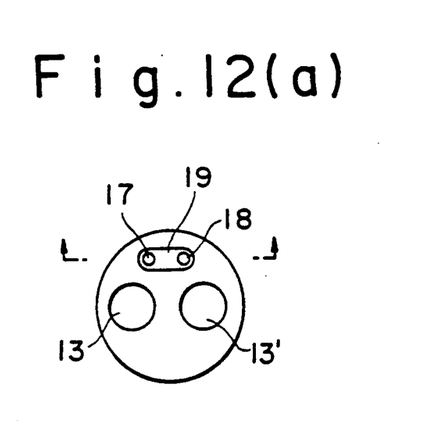
Figure 12B:
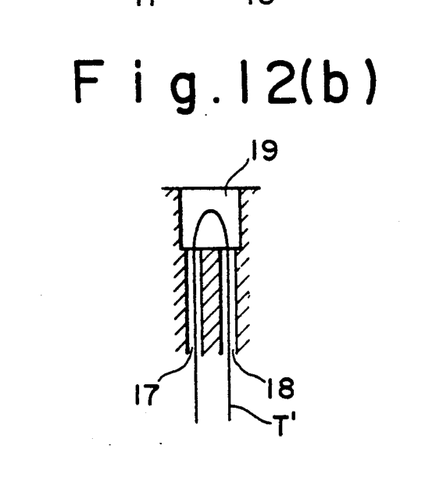

Illustrated in FIGS. 10 to 12 are modified constructions including means for concentrically aligning the tubular sections of the insulating tube 31. In the modification of FIG. 10, the tubular sections of the insulating tube 31 are provided with a pair of through holes 34 and 35 in alignment in the axial direction in addition to the rod receptacle holes 33 and 33', and aligning rods of a W and/or W-Re material similar to the rod members of the thermocouple are inserted in these through holes along the entire length thereof. On the other hand, in the modification of FIGS. 11 and 12, the insulating tube 31 is provided with means which is capable of testing by an approved commercially available thermocouple, in addition to the concentric alignment of the rod receptacle holes 33 and 33'. Namely, the insulating tube is provided with holes 37 and 38 for receiving the wires of an approved thermocouple, with a sunken portion 39 on the uppermost end face of the tubular sections across the wire holes 37 and 38 to receive the fore end of the approved thermocouple T'.

Figure 13:
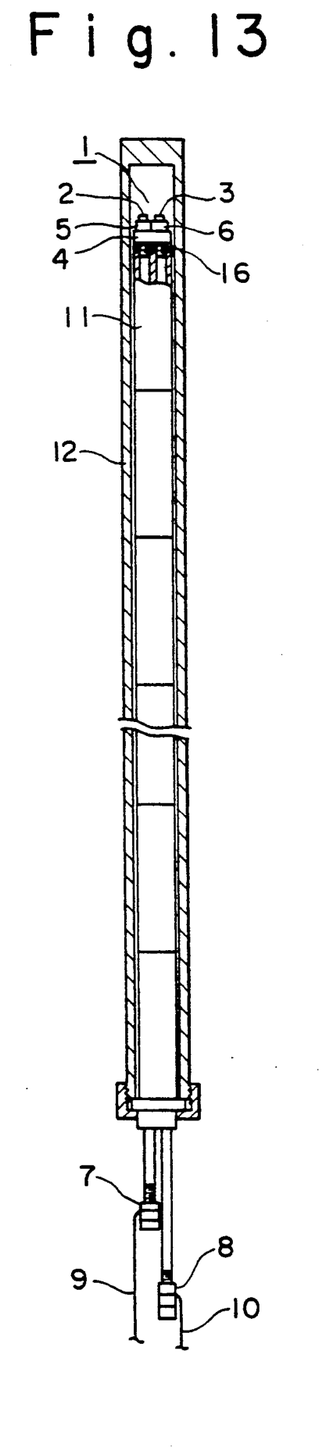
FIG. 13 is a schematic longitudinal section, showing another modification of the thermocouple unit according to the invention.

FIG. 13 shows a further modification of the thermocouple temperature detector of the invention, wherein a spacer 16 of a material different from the insulating tube 31 and having a couple of holes is interposed between the uppermost end of the insulating tube 31 and the fastening botton 4 to improve the accuracy of measurement by preventing drops in thermo-electromotive force due to contact between the thermocouple and the insulating tube during use over a long period of time.

Figures 14A, 14B:
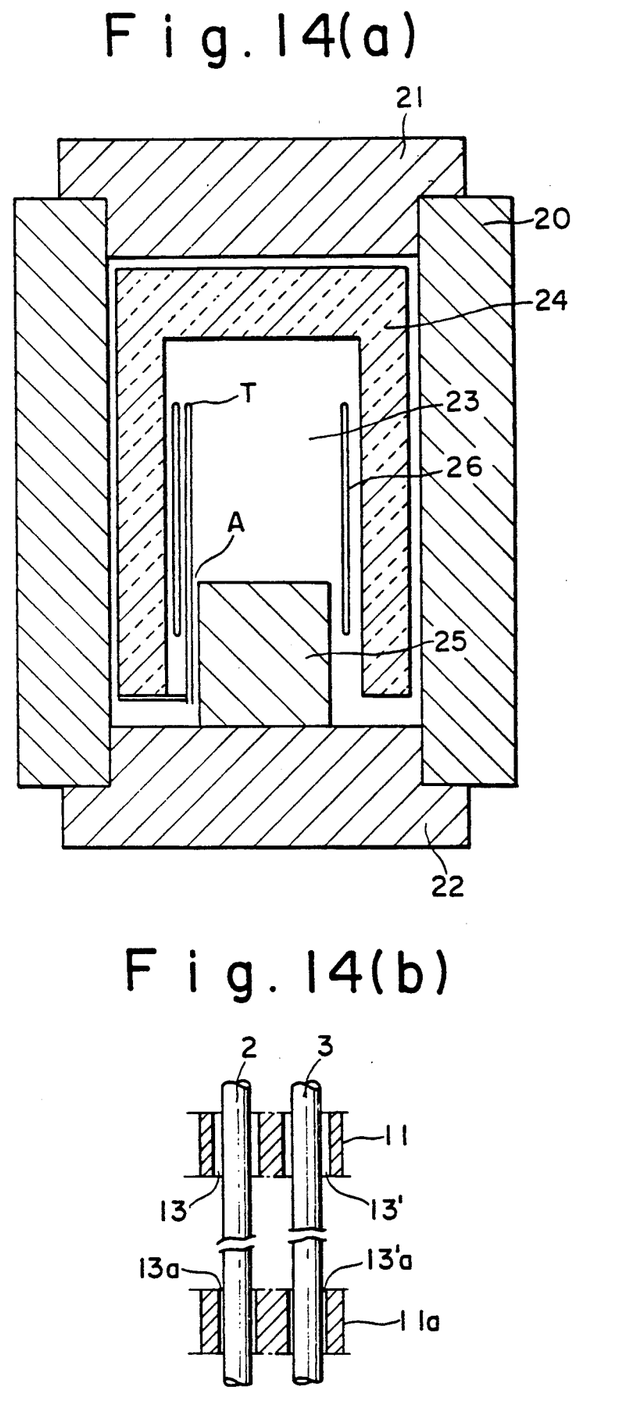
FIG. 14(a) is a schematic section of a HIP apparatus incorporating the thermocouple unit of FIG. 8.
FIG. 14(b) is a fragmentary section, showing upper and lower parts of the thermocouple unit.

Similarly to the foregoing embodiments, the thermocouple unit with the above-described modified construction is located, for example, in a high temperature and pressure container of a HIP apparatus by a support member on the inner side of a heater 26 which is mounted inward of a heat insulating wall 24.

In this instance, the rod members 2 and 3 are supported in suspended state within the rod receptacle holes 33 and 33' of the insulating tube 31, leaving a gap space around the rod members 2 and 3 as they are smaller in diameter than the rod receptacle holes 33 and 33'. In the case of the thermocouple shown in FIG. 8, the rod members 2 and 3 are disposed almost clear of the insulating tube, contacting the latter only at an upper point B. (See the upper tubular section of FIG. 14(b).)

Namely, the rod receptacle holes 33 and 33' in at least one tubular section 31a which is located in a region below the upper end A of the work support block 25, which also serves as heat insulation on the lower side of the furnace chamber 23, are formed in a diameter substantially same as that of the rod members 2 and 3 (see the lower tubular section of FIG. 14(b)). Therefore, even if they are in contact with each other at that tubular section, the rigid rod members 2 and 3 are contacted with the insulating tube 31 or its tubular sections 31a only at the point B of FIG. 8 in high temperature regions, thus precluding shunt errors which would be caused by drops in electric insulating characteristics of the insulating material.

In a case employing a combination of a thermocouple of W-Re and an insulating tube of BN, the tubular section 31a with the narrower rod receptacle holes 33a and 33a' is preferred to be located in a temperature region lower than 1600° C. in consideration of the electric insulation resistivity of the insulating tube of BN which drops at temperatures higher than 1600° C.

However, since the object of the present invention can be achieved as mentioned hereinbefore in spite of the contact of the thermocouple rod members with the insulating tube at the point B of FIG. 8, it is preferred to avoid the contact even when the rod receptacle holes at the point B of the uppermost insulating section are formed in a smaller diameter, for the purpose of preventing shunt errors. The intended effects can be obtained in a sufficient degree unless the contact takes place in a region other than the uppermost portion.

Following are the results of tests on the thermocouple temperature detector according to the present invention.

TEST EXAMPLE 1

For thermocouple wires, there were expeimentally produced W-5%Re and W-26%Re rod members of 3 mm in diameter and 800 mm in length, with screws of M3×0.5 at the opposite ends thereof. There were also obtained fastening buttons of W-26%Re, nuts of W-5%Re and W-26%Re from the same lots as components for assembling the thermocouple rod members.

On the other hand, the protective sheaths for holding and suspending thermocouple rod members in a shielded state were produced from tungusten. Each thermocouple unit was assembled by suspending a thermocouple in a protective sheath and fitting an insulating spacer in a lower portion of the protective sheath in such a manner as to maintain a distance between the thermocouple rod members. Accordingly, the contact between the rod members of the thermocouple and the protective sheath was limited to the suspending holder portion. The resulting thermocouple unit was mounted on a HIP apparatus and subjected to a repeated endurance test of Ar 1000 kgf/cm$^2$×2000° C.×1 hr. For the purpose of comparison, W-Re5/26 thermocouples with wire diameters of 0.5 mm and 1.0 mm (products of HOSKINS) were inserted into insulating tubes according to the usual procedure, suspending each thermocouple from an upper portion of the insulating tube. These insulating tubes each with a thermocouple therein were fitted in protective sheaths which were closed at the respective fore ends, to obtain thermocouple units for use as test samples in a similar endurance test. According to the test results, the thermocouples of 0.5 mm and 1.0 mm wire diameters proved to have short service life lengths corresponding to only one cycle and 2-3 cycles of operation, respectively, in contrast to the thermocouple unit samples according to the invention which could endure at least 23 cycles of operation with an accuracy guarantee of ±1.0%.

TEST EXAMPLE 2

Spacers of BeO, ThO$_2$, HfO$_2$ and Y$_2$O$_3$ were inserted respectively into the thermocouples of the above-described construction for endurance test.

As a result of a repeated endurance test of Ar 1000 kgf/cm$^2$×2000° C.×1 hr, any one of the above-mentioned combinations proved to have a service life of at least a length corresponding to 25 cycles of operation with a accuracy guaragnee of ±1%, and the thermocouples could be easily extracted after use.

As clear from the foregoing description, the present invention is directed to a thermocouple temperature detector suitable for use in a high temperature and pressure furnace, the temperature detector employing a thermocouple consisting of a pair of rod members of a diameter larger than ordinary thermocouple wires and a protective sheath having a holder portion adapted to support the rod members in suspended state in the protective sheath without contacting the rod members at least in high temperature regions. Alternatively, the rod members are inserted in an insulating tube with rod receptacle holes of a larger diameter to support the rod members in suspended state almost without contacting them. As the thermocouple wires consist of rod members of a large diameter, it becomes possible to improve the service life of the thermocouple to a considerable degree, elongating the length of service life up to the wire breakage due to coarsening of crystal grains and increasing the resistivity to contamination with impurity components of the atmosphere gas. Consequently, the present invention has a conspicuous effect in reducing the frequency of thermocouple replacements to get the maximum performance of each thermocouple unit under high temperature and pressure condition, and facilitating the industrial processes utilizing a furnace of high temperature and pressure like HIP apparatus. Since the thermocouple temperature detector construction of the invention limits the contact between the thermocouple rod members and the insulating tube to an extremely small area at the upper end of the insulating tube or completely dispenses with the insulating tube, the shunt errors which would be caused by drops in electric insulation property of the insulating tube can be prevented to ensure practical temperature measurement of high accuracy.

In addition, the rod members of the thermocouple which are suspended from a holder portion at the upper end of the insulating tube or protective sheath have the respective lower portions in free state almost or completely free of contact with the insulating tube, so that the elongations of the respective rod members by thermal expansion can be absorbed by the lower portions, without inviting damages as caused to conventional thermocouples of this sort as a result of thermal expansion.

Although BN protective sheaths are suitable particularly for use in an $N_2$ gas atmosphere, metallic protective sheaths are preferable from the standpoints of improvement of strength, retention of a clean atmosphere in the sheath and prevention of electric noises on the thermocouple.

Further, the insertion or coating of a heterogeneous material on the rod suspending portion prevents deteriorations of the performance quality of the thermocouple caused by diffusion of substances as a result of contact between the thermocouple and the suspending portion, or prevents seizure of the thermocouple which would make its replacement difficult.

What is claimed is:

1. A temperature detector for use in a furnace said furnace defining, in its interior, a furnace atmosphere, and operating at a high temperature designated the operating temperature, the improvement comprising a thermocouple, said thermocouple comprising, thermocouple rods received in a tubular protective sheath for protection against the furnace atmosphere, comprising:

a pair of substantially mutually parallel rod members said rod members consisting essentially of materials selected from the group consisting of W, W-Re alloy base material and mixtures thereof, the composition of both said rod members being selected so as to be different, one from the other, using said W, said W-Re alloy base material and mixtures, said rod members being of a diameter in excess of 3 mm serving as a thermocouple pair for positive and negative sides, whereby said rod members are sufficiently rigid to preclude electrical contact therebetween at the operating temperature of said furnace;

a tubular protective sheath having a rod suspending means proximal to one end thereof for supporting said rod member therein and arranged to hold said rod members out of contact with each other and said tubular protective sheath except at a temperature measuring point.

2. The temperature detector of claim 1, wherein said rod members are formed of differing materials selected from the group consisting of W, W-Re alloy base material and mixtures thereof, and at least a portion of said tubular protective sheath is formed of a composition selected from the group consisting of BN, Mo-base metallic materials and W-base metallic materials.

3. The temperature detector of claim 1, wherein said rod members are held out of contact with each other and with said protective sheath except at said temperature measuring point by a spacing means.

4. The temperature detector of claim 3, wherein said spacing means is an electrically insulating spacer with holes for receiving said rod members.

5. The thermocouple of claim 1, wherein said rod members are vertically suspended from said rod suspending means.

6. The temperature detector of claim 1, wherein said thermocouple further comprises a rod fastening button having a lower side thereof abutted on said rod suspending means of said protective sheath.

7. The temperature detector of claim 6, wherein a material different from said protective sheath is applied at least to a contacting surface of said rod suspending means of said protective sheath and/or on the lower side of said rod fastening button of said thermocouple.

8. The temperature detector of claim 7, wherein said different material is applied in the form of a spacer or by coating the contacting surface of said rod suspending means of said protective sheath or said rod fastening button.

9. The temperature detector of claim 7, wherein said different material consists of at least one compound selected from the group consisting of BeO, $ThO_2$, $HfO_2$, $Y_2O_3$, $Al_2O_3$ and $ZrO_2$.

10. The temperature detector of claim 1, wherein said protective sheath is electrically grounded.

11. A temperature detector for use in a furnace including thermocouple rods received in a tubular protective sheath for protection against a furnace atmosphere, comprising:

a pair of rod members, said rod members consisting essentially of materials selected from the group consisting of W, W-Re alloy base material and mixtures thereof, the composition of said rod members being selected so as to be different, one from the other, based on selection of said W, W-Re and mixtures, said rod members being of a diameter in excess of 3 mm serving as a thermocouple pair;

an insulating tube having a rod suspending means for supporting said rod members therein and said insulating tube being provided with rod receptacle holes having a greater diameter than said rod members at least in one region to form a clearance between said thermocouple rod members and rod receptacle holes, suspending said rod members in said rod receptacle holes in a substantially contact-free state.

12. The temperature detector of claim 11, wherein said thermocouple rods are made of differing materials selected from the group consisting of a W base material, W-Re base material, and mixtures thereof and said insulating tube and/or protective sheath is made of BN at least in said region.

13. The temperature detector of claim 11, wherein at least one of said rod receptacle holes of said insulating tube is formed in a diameter substantially the same as that of said rod members in a second region.

14. The temperature detector of claim 11, wherein said insulating tube is constituted by a stack of short tubular sections.

15. The temperature detector of claim 14, wherein said insulating tube is provided with means for concentrically aligning said stacked tubular sections, including a pair of through holes formed in each tubular section in addition to said rod receptacle holes and aligning rods inserted in said through holes.

16. The temperature detector of claim 15, wherein said aligning rods are made of a W and/or W-Re base material.

17. The temperature detector of claim 14, wherein said insulating tube is provided with means for concentrically aligning said stacked tubular sections in the axial direction, including a pair of through holes formed in each tubular section in addition to said rod receptacle holes and thermocouple wires inserted in said through holes and suitable for testing the thermocouple of said temperature detector.

18. The temperature detector of claim 11, wherein said rod suspending means comprises a rod fastening button having an upper and a lower side, and wherein said thermocouple is supported in suspended state in said insulating tube, said insulating tube having an upper end and a lower end, with the lower side of said rod fastening button abutted on the upper end of said insulating tube.

19. The temperature detector of claim 18, wherein said thermocouple is supported in suspended state in said insulating tube, with the lower side of said rod fastening button abutted on the upper end of said insulating tube through a spacer of a different kind of material from said insulating tube or coating of a different kind of material from said insulating tube formed on the lower side of said rod fastening button.

20. The temperature detector of claim 19, wherein said different kind of material consists of at least one compound selected from the group consisting of BeO, $ThO_2$, $Y_2O_3$, $Al_2O_3$, and $ZrO_2$.

* * * * *